Patented Aug. 31, 1954

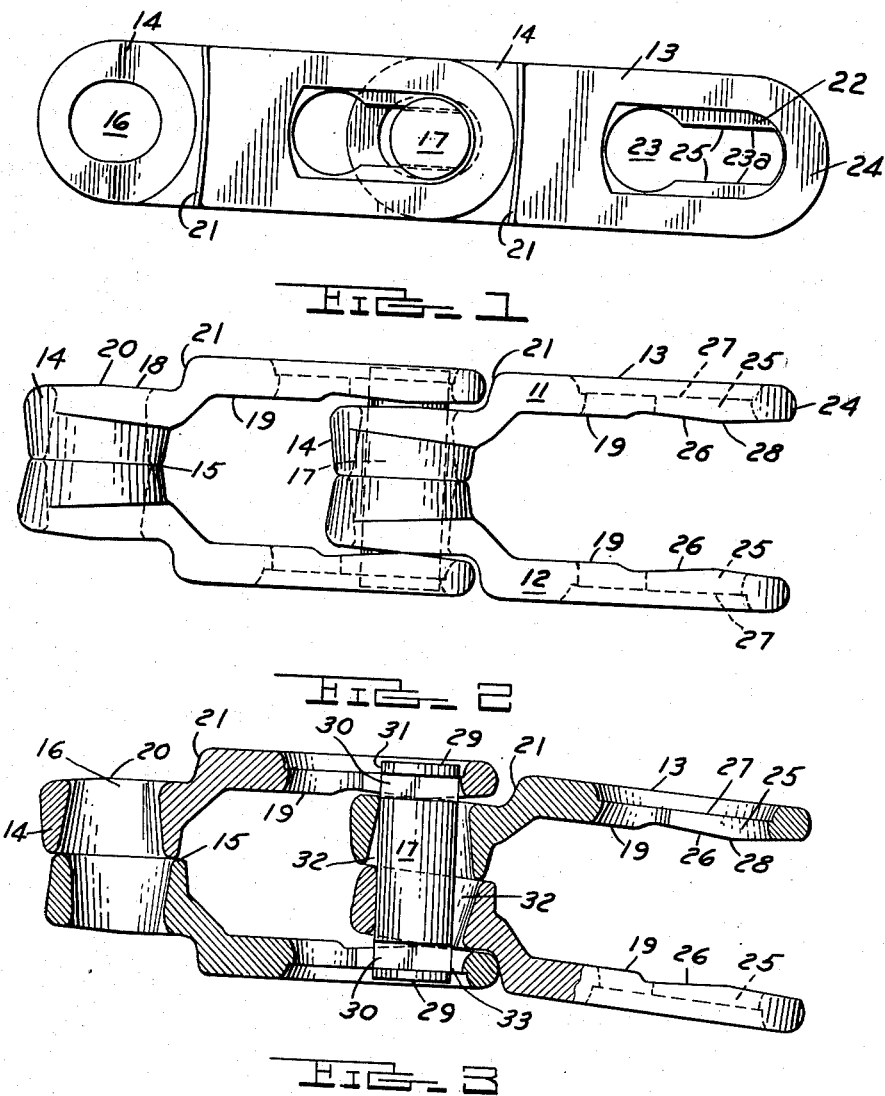

2,687,651

UNITED STATES PATENT OFFICE 2,687,651

CHAIN CONSTRUCTION

Jervis B. Webb, Bloomfield Hills, Mich., assignor to Jervis B. Webb Company, Detroit, Mich., a corporation of Michigan Application February 23, 1951, Serial No. 212,299

6 Claims. (Cl. 74—250)

This invention relates to improvements in the construction of chain of the type where a series of links are assembled in end to end nested relationship, each link being of identical construction and having one end of reduced width which is adapted to be received within an opposite clevis-shaped end of an adjacent link and to be connected thereto by a pin. In the field of material handling, chain of this type is often referred to as "dairy chain."

Essentially, the improvements of the invention consist in providing a link of split construction, that is a link composed of two half links of identical design, which has the advantage that the individual half links can be manufactured by forging rather than by the casting method used to fabricate one-piece links for chain of this type. Greater lateral flexibility—that is, flexibility in the plane of the axes of the connecting pins, as distinguished from longitudinal flexibility resulting from pivotal movement of the links about the pins in a plane perpendicular to their axes—results from this split construction, particularly when employed in combination with certain improvements in the shape of the mating surfaces of the parts, and in combination with a type of pin connection which permits a certain degree of relative sliding movement between the parts longitudinally of the chain. Preferably, the pin connection employed is of the self-locking type to facilitate the process of assembly or replacement of links in the chain.

In the field of material handling, dairy chain is frequently employed in a manner somewhat analogous to uses of conveyor belts—the chain being propelled along a surface and used to both motivate and support articles for their transportation. In this use lateral flexibility of the chain is very important, as it determines the maximum degree of curvature, or turning radius that can be given to the path of chain travel.

A preferred embodiment of the chain of the present invention is disclosed in the accompanying drawing and will be described in detail hereinafter. This drawing comprises:

Fig. 1, a side elevation of two links of chain in assembled relationship;

Fig. 2, a plan view of the elements of Fig. 1; and

Fig. 3, a plan view, partly in section, showing the action of the chain elements during lateral flexing of the chain.

Each complete link of chain is composed of a pair of identical half links 11 and 12, with each half link being formed with a side portion 13 and a boss portion 14, and in assembled condition the inner faces 15 of the boss portions of a pair of half links are directly opposed substantially along the center line of the chain.

Each boss portion is provided with a hole 16, which is dimensioned to provide ample clearance with the diameter of the connecting pin 17 passing through the boss portion when the chain elements are assembled, this clearance preferably resulting from the hole 16 being formed to an elongated or oval shape, with the major axis of the oval extending in the direction of the longitudinal axis of the link, and being also formed to flare toward the inner boss surface 15 and outer boss surface 18. The outer surface 18 of each boss portion lies slightly within the inner surface 19 of each side portion 13, and is preferably tapered away from an apex point 20 which lies substantially in line with the center of the hole 16. A shoulder 21 marks the dividing line between each boss portion 14 and each side portion 13, with the height of this shoulder being slightly greater than the thickness of the side portion.

Each side portion 13 has an oblong recess 22 formed in its outer face with a keyhole slot 23, having its slotted end 23a directed toward the semi-circular end 24 of the side portion, cut in this recess. This results in providing a pair of inwardly directed shoulders 25 along the sides of the slotted portion 23a, the lower surface 26 of these shoulders being flush with the lower surface of the side portion 13 and the upper surface 27 thereof lying at the level of the bottom of the recess 22. Preferably, the thickness of each half link, near the end of the side portion thereof and across the shoulders of the keyhole slot, is tapered so that the apex 28, or point of maximum thickness of this tapered section lies approximately in line with the center of the connecting pin when the links are joined in normal assembled relationship.

This connecting pin 17 is cylindrical in shape with flush ends 29 and has a pair of slots 30 provided adjacent to each end. These slots are dimensioned to engage the shoulders of each half link across their point of maximum thickness and the slots are spaced from the ends 29 of the pin a distance 31 substantially equal to the depth of the recess 22 formed in the face of the side portion 13 of each half link, resulting in the ends of the pin being substantially flush with the outer surface of each half link when the chain is assembled.

To assemble a pair of half links to an adjacent pair of half links, one pair is rotated 90 degrees from the position shown in Fig. 1 and placed in a position where the circular portion of each keyhole slot 23 is in alignment with the hole 16 through the boss portions of the adjacent pair of half links. With the parts in this relationship, the pin 17 can be inserted through all four half links, and then the half links of the pair in the previously mentioned 90 degree position can each be moved relative to the pin so that their shoulders 25 will be brought into engagement with the slots 30 in the pin. During this movement the half links can be rotated from the 90 degree position to the position shown in Fig. 1.

Lateral flexibility of the assembled chain results first from the fact that each half link is free to move individually to a canted position relative to the pin 17. The extent of this canting movement is increased by the flared clearance 32 between the pin 17 and bore 16 of each boss portion, and by the tapered shape of the inner surface 26 of the side portion of each half link, and the adjacent tapered outer surface 18 of the boss portion of the next half link. Any lateral flexing or curvature of the chain necessarily means that the series of half links on the outside of the curve have to cover a longer distance than the series on the inside thereof. A telescoping action of the inside links is therefor required, and in the present construction this is facilitated by the elongated shape of the hole 16 and additionally by the fact that the side portion of each half link is free move relative to the pin to a position of clearance, as indicated by the numeral 33 in Fig. 3, between the pin and the end of the keyhole slot 23.

I claim:

1. A link construction for a chain of the type wherein a series of links are connected in nested end-to-end relationship by pins with each link having a reduced end adapted to be positioned between an opposite clevis end of an adjacent link, said link construction comprising a pair of complementary half links, each half link including a boss portion, a hole provided in said boss portion transversely of said link and adapted to receive a connecting pin, said boss portions of a pair of half links forming the said reduced end of a link, each half link further including a side portion forming half the said clevis end of a link, said side portion being provided with a recess in the outer surface thereof, means comprising a key hole slot formed in said recess to slidably engage said connecting pin for relative movement between said side portion and said pin longitudinally of said half link, the slotted portion of said key hole slot being directed toward the clevis end of said half link and having inwardly facing shoulders spaced below the outer surface of said side portion, and means carried by said connecting pin adjacent each end thereof to engage said shoulders of a half link for said sliding relative movement.

2. A link construction according to claim 1 further characterized by the said engaging means carried by said connecting pin being spaced inwardly from each end of said pin a distance substantially equal to the depth of said recess whereby the ends of said pin are substantially flush with the outer surface of the side portion of each half link when said link is assembled to a successive link.

3. A link construction for a chain of the type wherein a series of links are connected in nested end-to-end relationship by pins with each link having a reduced end adapted to be positioned between an opposite clevis end of an adjacent link, said link construction comprising a pair of complementary half links, each half link including a boss portion, a hole provided in said boss portion transversely of said link and adapted to receive a connecting pin, said boss portions of a pair of half links forming the said reduced end of a link, each half link further including a side portion forming half the said clevis end of a link, said side portion being provided with slot means to slidably engage said connecting pin for relative movement between said side portion and said pin longitudinally of said half link, said slot means being provided with inwardly facing shoulders, means carried by said connecting pin adjacent each end thereof to engage said shoulders of a half link for said sliding relative movement, and at least one of the adjacent faces consisting of the outer face of said boss portion and the inner face of said side portion being relieved to provide an area of minimum surface contact between successive links when in assembled relation, said area normally being substantially aligned with the longitudinal center line of said pin when said chain is in straight line position.

4. A link construction for a chain of the type wherein a series of links are connected in nested end-to-end relationship by pins with each link having a reduced end adapted to be positioned between an opposite clevis end of an adjacent link, said link construction comprising a pair of complementary half links, each half link including a boss portion, a hole provided in said boss portion transversely of said link and adapted to receive a connecting pin, said boss portions of a pair of half links forming the said reduced end of a link, each half link further including a side portion forming half the said clevis end of a link, said side portion being provided with slot means to slidably engage said connecting pin for relative movement between said side portion and said pin longitudinally of said half link, said slot means being provided with inwardly facing shoulders, means carried by said connecting pin adjacent each end thereof to engage said shoulders of a half link for said sliding relative movement, and said transverse hole provided in the boss portion of each half link being formed for clearance with the connecting pin received therein for relative movement between a pair of complementary half links in a direction longitudinally thereof and for relative movement between each half link and said pin in a direction substantially parallel to the axis of said pin.

5. A link construction for a chain of the type wherein a series of links are connected in nested end-to-end relationship by pins with each link having a reduced end adapted to be positioned between an opposite clevis end of an adjacent link, said link construction comprising a pair of complementary half links, each half link including a boss portion, a hole provided in said boss portion transversely of said link and adapted to receive a connecting pin, said boss portions of a pair of half links forming the said reduced end of a link, each half link further including a side portion forming half the said clevis end of a link, said side portion being provided with a recess in the outer surface thereof, slot means formed in said recess to slidably engage said connecting pin for relative movement between said side portion and said pin longitudinally of said half link, said slot means being provided with inwardly facing shoulders spaced below the outer surface of said half link, and means carried by said connecting pin to engage said shoulders, said engaging means being spaced inwardly from each end of said pin a distance substantially equal to the depth of said recess whereby the ends of said pin are substantially flush with the outer surface of the side portion of each half link when said link is assembled.

6. A link construction for a chain of the type wherein a series of links are connected in nested end-to-end relationship by pins with each link having a reduced end adapted to be positioned between an opposite clevis end of an adjacent link, said link construction comprising a pair of complementary half links adapted to be positioned on either side of the longitudinal center line of the chain when in assembled relationship, each half link including a boss portion having its inner face extended substantially to the center line of the chain, a hole provided in said boss portion and adapted to receive a connecting pin for relative movement longitudinally of said half link, and a side portion having its inner surface spaced outwardly from the outer surface of said boss portion, said side portion being provided with key hole slot means to slidably engage a connecting pin for relative movement between said side portion and said pin longitudinally of said half link, said key hole slot being formed with its slotted portion adjacent the end of each side portion and its hole spaced inwardly from the end of said side portion, said slotted portion having inwardly facing shoulders, and said connecting pin being provided with a transverse slot portion adjacent the end thereof to engage said shoulders.

References Cited in the file of this patent

UNITED STATES PATENTS

| Number | Name | Date |
|---|---|---|
| 302,812 | Anderson | July 29, 1884 |
| 508,258 | Taplin | Nov. 7, 1893 |
| 818,469 | Rogers | Apr. 24, 1906 |
| 820,219 | Levalley | May 8, 1906 |
| 1,804,701 | Mojonnier | May 12, 1931 |